Patented May 9, 1950

2,506,654

UNITED STATES PATENT OFFICE 2,506,654

DERIVATIVES OF 4-AMINO-ANTIPYRINE

Berthold Stein, Baith Wegan, near Jerusalem, Palestine, assignor to the firm Teva Chemical Manufacturing Company Limited, Jerusalem, Palestine No Drawing. Application January 4, 1945,
Serial No. 571,359

6 Claims. (Cl. 260—295)

This invention consists in new derivatives of antipyrine (1-phenyl-2,3-dimethyl-pyrazolone) and in processes of their preparation.

The invention consists more particularly in derivatives of 4-amino-antipyrine (1-phenyl-2,3-dimethyl-4-amino-pyrazolone) of the general formula

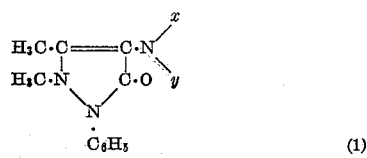

(1)

wherein X stands for one carboxyl group of a dicarboxylic acid selected from the group consisting of aliphatic, aromatic, hydroaromatic and heterocyclic dicarboxylic acids and their mono salts and esters, and Y stands for a radical selected from the group consisting of hydrogen, alkyl radicals and the second carboxyl group of a dicarboxylic acid the other carboxyl group of which is already connected to the same nitrogen atom in the position X aforesaid.

The invention, therefore, comprises two principal classes of compounds which are closely interrelated and are to a certain extent interconvertible, as will be explained hereinafter. The two classes can be expressed by the following two general formulae (2) and (3) respectively:

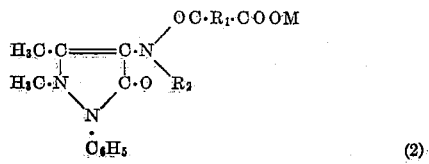

(2)

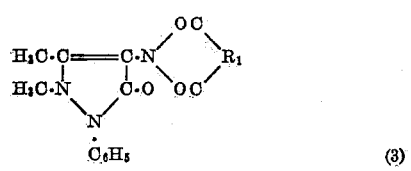

(3)

In these, $R_1$ signifies an aliphatic, aromatic, hydro-aromatic or heterocyclic radical, and $R_2$ stands for hydrogen or an aliphatic radical, e. g. methyl or ethyl, while M signifies either hydrogen or a metal, e. g. an alkali or alkaline earth metal, or an organic radical with which the carboxyl group may be esterified, e. g. methyl or ethyl.

Aliphatic dicarboxylic acids that come into regard, are, for example, succinic acid, adipic acid and tartaric acid; suitable aromatic acids are, for example, phthalic acid and any of the several ortho-naphthalene dicarboxylic acids, including the 1:8-(peri-) dicarboxylic acid (naphthalic acid) which behaves like an ortho-dicarboxylic acid; a suitable hydroaromatic acid is hexahydro-phthalic acid; as heterocyclic acids there may be named, for example, any of the several pyridine, piperidine, or quinoline ortho-dicarboxylic acids; it being understood that this enumeration is by way of example only and does not imply any limitation of the invention.

The invention is illustrated by, but not limited to, the following examples:

Example 1

A solution of 406 grs. (2 moles) of 4-amino antipyrine

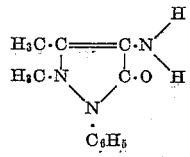

in about 4 times its weight of water is warmed in a water-bath to 30° C., and 300 grs. (slightly in excess of 2 moles) of finely powdered phthalic anhydride are introduced into the solution. The mixture is stirred and its temperature is gradually raised to about 75° C., when a further 60 grs. of phthalic anhydride are added. The mixture is then stirred for about 1½ hours at 90 to 95° C. By this time, the precipitate which at first forms as a viscous oil has become crystalline. The mixture is then filtered with suction, the precipitate is thoroughly washed with water and dried, whereby it is obtained in small, heavy, brittle yellowish crystals of M. P. 206/8° C. This is the 4-phthalimido-antipyrine of the formula

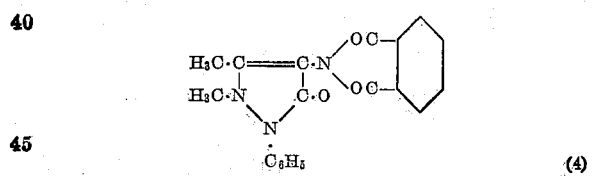

(4)

This compound is soluble in sulfuric acid of 50% strength by weight, the solution being virtually colorless. From this solution, the unaltered compound can be precipitated by neutralisation with alkali hydroxide or carbonate. The compound is also soluble in dilute aqueous alkali hydroxide even at ordinary temperature, but not without alteration, as will be explained hereinafter. The compound is insoluble in water and dilute alkali bicarbonate, but soluble in organic solvents, e. g. ethyl alcohol, acetone or pyridine.

Example 2

406 grs. of 4-amino-antipyrine are dissolved in 800 grs. of dry acetone and the solution is gradually poured into a solution or suspension of 300 grs. of phthalic anhydride in 600 grs. of acetone which is kept at a temperature of 40 to 50° C. Any portion of phthalic anhydride that had originally remained undissolved soon dissolves, and soon there form beautiful yellowish-white crystals. The mixture is kept at 50 to 60° C. for a further short time, then the crystalline is separated from the liquor by filtration with suction, washed with acetone and dried. The product so obtained consists of nearly colorless crystals melting at 170 to 175° C. with loss of water. They are insoluble in water but soluble in dilute aqueous alkali hydroxide, carbonate and bicarbonate as well as in organic solvents, e. g. benzene, xylene, cyclohexanol. This is the 4-(N-phthalyl)-amino-antipyrine of the formula

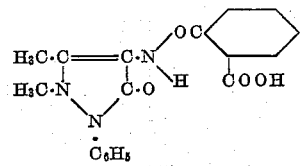

(5)

If this compound is dissolved in a dilute aqueous solution of sodium bicarbonate and the solution concentrated by evaporation, the sodium salt of the phthalyl-amino-compound is obtained. This has the formula

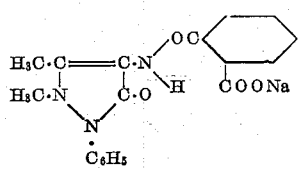

(6)

It is a matter of course that the reaction can be carried out with potassium bicarbonate instead of with sodium bicarbonate, whereby the corresponding potassium salt is obtained.

The phthalyl-amino-compound according to Formula 5 is interconvertible with the phthalimido-compound according to Formula 4.

Example 3

The phthalimido-compound of Formula 4 obtained according to Example 1 is taken up in dilute aqueous alkali hydroxide and allowed to stand at room temperature for some time until it is completely dissolved, whereby an aqueous solution of the sodium phthalyl-amido-compound of Formula 6 is formed. From this solution, the free phthalyl-amino-compound of Formula 5 can be precipitated by acidulation.

Example 4

The phthalyl-amino-compound of Formula 5 is dissolved in 10 times its weight of xylene and heated to boiling until no more water distils off. When the xylene is then distilled, a precipitate of the phthalimido-compound of Formula 4 forms gradually.

The same conversion can be brought about by heating the said phthalyl-amino-compound above its melting point.

Example 5

The reaction is carried out as in Example 1, but phthalic acid is used instead of phthalic anhydride. First, 340 grs. thereof are added, and thereafter 65 grs.

Example 6

In a flask provided with stirrer, 75 grs. of the phthalimido-compound of Formula 4 are mixed with 120 cc. of water, and 120 grs. of a 50% by weight aqueous sodium hydroxide solution are gradually added with stirring and cooling. The phthalimido-compound first dissolves, later on there separates an amorphous, slimy precipitate of the sodium salt of the phthalyl-amino-compound of Formula 6. After about 1 hour from the beginning of the addition of sodium hydroxide, the gradual addition, drop by drop, of 42.5 grs. of dimethyl sulfate is begun, the temperature being kept at 25–30° C. In consequence of the reaction thereby produced, the amorphous precipitate aforesaid dissolves. When this is completed, the mixture is cautiously neutralized with mineral acid, the temperature being kept by cooling at room temperature or slightly above. There ensues a slow crystallisation of sodium sulfate and 4-(N-methyl-N-phthalyl)-amino-antipyrine of the formula

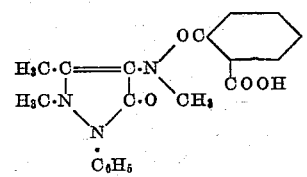

(7)

While this crystallisation goes on, so much dilute sulfuric acid is added in small portions that the liquor is slightly but distinctly acid towards Congo paper (blue reaction). The crystal magma finally obtained is separated from the liquid by filtration with suction and triturated with about 300 cc. of water whereby the sodium sulfate is dissolved while the aforesaid compound of Formula 7 remains undissolved. The undissolved compound is separated from the liquor by filtration and washed with water.

The compound appears to be crystallised with one molecule of crystal water. On being heated it loses the water and has a melting point of 208–210° C.

When this compound is heated with strong mineral acid, the phthalic acid radical can be split off. For example, 100 grs. of the compound of Formula 7 are introduced with stirring into 100 grs. of sulfuric acid of 50% strength by weight at about 80° C., wherein they dissolve at once. The liquor is heated with stirring to about 100° C. for about 1 hour. Upon the formation of the first crystals, which are either phthalic acid or its anhydride, the mixture is further heated for some time and then allowed to cool, whereupon ample crystallisation takes place. The precipitate is removed by filtration and washed with water, and the filtrate and washing water contain the sulfate of 4-(N-methyl)-amino-antipyrine. The free base can be obtained by alkalifying the aqueous solution of the sulfate. It has the formula

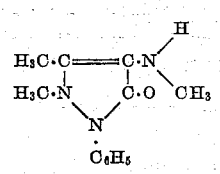

(8)

Example 7

A solution of 75 grs. of quinolinic anhydride in 220 grs. of acetone is warmed to 50 to 60° C, and gradually added to, with a solution of 100 grs. of 4-amino-antipyrine in 200 grs. of acetone. An exothermic reaction takes place, and yellowish-white crystals soon begin to precipitate. After a short time the mixture is allowed to cool and the precipitate is separated by filtration with suction and washed with acetone. The compound thus obtained melts at 144 to 146° C. while water is separated. It is readily soluble at ordinary temperature in dilute aqueous sodium bicarbonate solution and can be recovered unchanged from such solution by precipitation with dilute mineral acid. The compound is sparingly soluble in water at ordinary temperature.

This compound is presumably 4-(N-quinolinyl)-amino-antipyrine having either formula

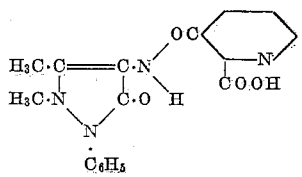

(9a)

or

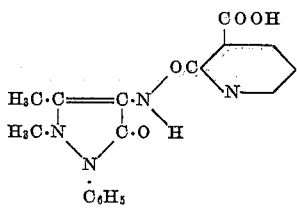

(9b)

If this compound is heated above its melting point and made to lose water, a compound is formed that can be crystallised from dilute alcohol in beautiful, faintly yellowish white prisms. This is presumably the 4-quinolinimido-antipyrine of the formula

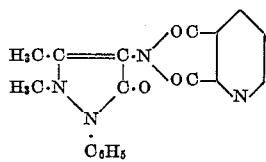

(10)

Unlike its parent product it is insoluble in dilute aqueous sodium bicarbonate solution, while it can be converted into an alkali metal salt of the parent compound by the action of dilute alkali hydroxide.

*Example 8*

70 grs. of the compound of Formula 9a or 9b are suspended in 140 grs. of water, and a solution of 48 grs. of sodium hydroxide in 48 grs. of water is slowly added with stirring. After about one sixth of the sodium hydroxide solution has been added, the mixture is stirred at 30 to 35° C. until the starting material is completely dissolved, whereafter the rest of the sodium hydroxide is gradually added. Hereafter, 38 grs. of dimethyl sulfate are added with vigorous stirring while the mixture is kept at 25 to 30° C. After the introduction of the whole amount of dimethyl sulfate the mixture is further stirred for a short time and then cautiously added to with dilute sulfuric acid until the reaction is slightly acid towards Congo paper, whereby a precipitate of yellowish-white, fine prisms is formed. This is separated and washed and melts at 124 to 125° C. with loss of water and is presumably 4-(N-methyl-N-quinolinyl)-amino-antipyrine of either formula

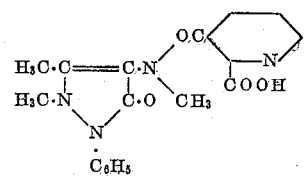

(11a)

or

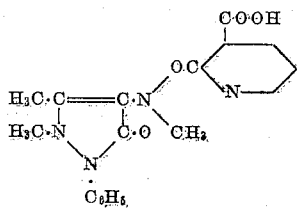

(11b)

If this compound is heated with sulfuric acid of 40% strength and then alkalified, 4-(N-methyl)-amino-antipyrine of Formula 8 is obtained.

*Example 9*

A solution of 100 grs. of 4-amino-antipyrine in 200 grs. of acetone is added at 50 to 60° C. with stirring to a solution or suspension of 50 grs. of succinic anhydride in 300 grs. of acetone. There ensues a considerable development of heat, and the rate of introduction of the former to the latter solution is so regulated that the aforesaid temperature is substantially maintained. The succinic anhydride is soon completely dissolved and yellowish-white cyrstals, sparingly soluble in acetone, separate. The mixture is kept for a short time at the temperature aforesaid, then allowed to cool and filtered with suction, and the residue washed with acetone. The compound thus obtained melts at 196 to 198° C. with loss of water and is presumably the 4-(N-succinyl)-amino-antipyrine of the formula

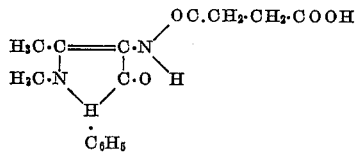

(12)

I claim:
1. The new 4-N-acylamino-1-phenyl-2:3-dimethyl-pyrazolone derivatives of the general formula

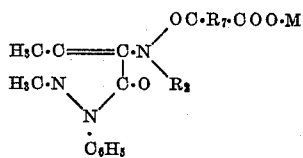

wherein the radical —OC.R₁.COO. is that of a cyclic dicarboxylic acid selected from the group consisting of phthalic acid, an ortho-naphthalene dicarboxylic acid, hexahydrophthalic acid, and a pyridine orthodicarboxylic acid, a piperidine orthocarboxylic acid and a quinoline orthodicarboxylic acid; M stands for a member selected from the group consisting of hydrogen, an alkali metal, an alkaline earth metal, and an alkyl radical; and R₂ stands for a member selected from the group consisting of hydrogen and an alkyl radical.

2. 4-(N-methyl-N-phthalyl)-amino-1-phenyl-

2:3-dimethyl-pyrazolone derivatives of the general formula

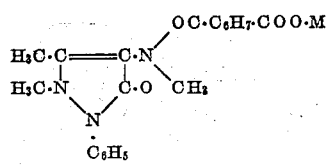

wherein M stands for a member selected from the group consisting of hydrogen, an alkali metal, an alkaline earth metal, and an alkyl radical.

3. 4 - (N - methyl - N - quinolinyl) - amino - 1-phenyl-2:3-dimethyl-pyrazolone.

4. The process of preparing 4-N-acylamino-1-phenyl-2:3-dimethyl-pyrazolone derivatives according to claim 1, which process comprises causing 4-amino-1-phenyl-2:3-dimethyl-pyrazolone to react with a compound selected from the group consisting of phthalic acid, an ortho-naphthalene dicarboxylic acid, hexahydrophthalic acid, a pyridine orthodicarboxylic acid, a piperidine orthodicarboxylic acid, and a quinoline orthodicarboxylic acid.

5. The process of preparing 4-N-acylamino-1-phenyl-2:3-dimethyl-pyrazolene derivatives according to claim 1, which process comprises causing 4-amino-1-phenyl-2:3-dimethyl-pyrazolone to react in an aqueous medium with a compound selected from the group consisting of phthalic acid, an orthonaphthalene dicarboxylic acid, hexahydrophthalic acid, a pyridine orthodicarboxylic acid, a piperidine orthodicarboxylic acid, and a quinoline orthodicarboxylic acid.

6. The process of preparing 4-N-acylamino-1-phenyl-2:3-dimethyl-pyrazolone derivatives according to claim 1, which process comprises causing 4-amino-1-phenyl-2:3-dimethyl-pyrazolone to react in acetone with a compound selected from the group consisting of phthalic acid, an ortho-naphthalene dicarboxylic acid, hexahydrophthalic acid, a pyridine orthodicarboxylic acid, a piperidine orthodicarboxylic acid, and a quinoline orthodicarboxylic acid.

BERTHOLD STEIN.

REFERENCES CITED

The following references are of record in the file of this patent:

UNITED STATES PATENTS

| Number | Name | Date |
|---|---|---|
| 1,906,200 | Reuter | Apr. 25, 1933 |
| 2,401,522 | Stoll et al. | June 4, 1946 |

FOREIGN PATENTS

| Number | Country | Date |
|---|---|---|
| 7,709 | Great Britain | of 1896 |
| 227,013 | Germany | Oct. 13, 1910 |